United States Patent
Jeon et al.

(10) Patent No.: US 9,237,632 B2
(45) Date of Patent: Jan. 12, 2016

(54) ILLUMINATION LIGHTING APPARATUS AND METHOD OF CONTROLLING ILLUMINATION

(75) Inventors: Jong Hoon Jeon, Seoul (KR); Min Ho Cha, Seoul (KR); Joong Hun Jin, Changwon-si (KR)

(73) Assignee: SAMSUNG ELECTRONICS CO., LTD., Suwon-Si, Gyeonggi-Do (KR)

( * ) Notice: Subject to any disclaimer, the term of this patent is extended or adjusted under 35 U.S.C. 154(b) by 991 days.

(21) Appl. No.: 13/396,326

(22) Filed: Feb. 14, 2012

(65) Prior Publication Data

US 2012/0248992 A1 Oct. 4, 2012

(30) Foreign Application Priority Data

Mar. 30, 2011 (KR) .................. 10-2011-0028674

(51) Int. Cl.
*H05B 37/02* (2006.01)

(52) U.S. Cl.
CPC ............. *H05B 37/0227* (2013.01); *Y02B 20/44* (2013.01)

(58) Field of Classification Search
CPC .......................... H05B 37/0227; Y02B 20/44
See application file for complete search history.

(56) References Cited

U.S. PATENT DOCUMENTS

| | | | |
|---|---|---|---|
| 7,091,886 B2 * | 8/2006 | DePue et al. ............ | 341/33 |
| 7,585,092 B2 | 9/2009 | Huffman | |
| 8,830,067 B2 * | 9/2014 | Igaki et al. ............ | 340/573.1 |
| 2004/0046795 A1 * | 3/2004 | Josephson et al. ...... | 345/764 |
| 2006/0044800 A1 * | 3/2006 | Reime ................. | 362/276 |
| 2008/0238665 A1 * | 10/2008 | Peng .................. | 340/540 |
| 2009/0073694 A1 * | 3/2009 | Scannell, Jr. .......... | 362/253 |
| 2009/0229955 A1 * | 9/2009 | Hein et al. ............ | 200/42.01 |
| 2010/0060611 A1 * | 3/2010 | Nie ................... | 345/175 |
| 2010/0101924 A1 * | 4/2010 | Wu et al. .............. | 200/339 |
| 2010/0277073 A1 * | 11/2010 | Van Endert ............ | 315/149 |
| 2010/0305418 A1 * | 12/2010 | Deliwala .............. | 600/324 |
| 2012/0312956 A1 * | 12/2012 | Chang et al. .......... | 250/201.1 |
| 2013/0293722 A1 * | 11/2013 | Chen .................. | 348/164 |
| 2013/0294067 A1 * | 11/2013 | Engel-Hall et al. ...... | 362/233 |
| 2013/0300316 A1 * | 11/2013 | Engel-Hall et al. ...... | 315/307 |
| 2014/0225526 A1 * | 8/2014 | Jonsson ............... | 315/291 |
| 2014/0239843 A1 * | 8/2014 | Hoang ................. | 315/291 |
| 2014/0239844 A1 * | 8/2014 | Bruwer ................ | 315/292 |

FOREIGN PATENT DOCUMENTS

| | | |
|---|---|---|
| JP | 2009-016050 A | 1/2009 |
| KR | 10-2010-0111416 A | 10/2010 |

* cited by examiner

*Primary Examiner* — Thomas J Hiltunen
(74) *Attorney, Agent, or Firm* — McDermott Will & Emery LLP

(57) ABSTRACT

Provided are an illumination lighting apparatus that provides various and intuitional light in response to a motion of a user, and an illumination controlling method. The illumination lighting apparatus may include a lamp unit including at least one light emitting part that is selectively turned on and off, a motion sensing unit including at least one motion sensor, transmitting a sensed signal when the at least one motion sensor senses a motion of a user, and enabling the lamp unit to provide a light corresponding to the sensed signal, and a control unit to receive the sensed signal from the motion sensing unit to adjust a light emitting type of the lamp unit in a plurality of modes, and the motion sensing unit may transmit, based on a mode of the control unit, different sensed signals to the control unit to change the light emitting type of the lamp unit.

8 Claims, 7 Drawing Sheets

ILLUMINATION LIGHTING APPARATUS AND METHOD OF CONTROLLING ILLUMINATION

CROSS-REFERENCE TO RELATED APPLICATION

This application claims the priority benefit of Korean Patent Application No. 10-2011-0028674, filed on Mar. 30, 2011, in the Korean Intellectual Property Office, the disclosure of which is incorporated herein by reference.

BACKGROUND

1. Field

Example embodiments relate to an illumination lighting apparatus and an illumination controlling method, and more particularly, to an illumination lighting apparatus and an illumination controlling method that may provide various and intuitional light in response to a motion of a user including a touch, a drag, and a motion.

2. Description of the Related Art

A fluorescent light and an incandescent lamp using a common alternating current (AC) power source are commonly used as a lighting device. The fluorescent light that has excellent power efficiency and has a relatively higher illuminance is more popular. The lighting device may be installed in any place that provides a power source and that has no difficulty in installing the lighting device. As demand for the lighting device increases and a number of fields using the lighting device increases, and loads with respect to a total power consumption increases. Accordingly, there are various attempts to decrease the power consumption.

A light emitting diode (LED) has been drawing attention as the lighting device and has been applied to various fields. The LED is applied to a keypad light of a mobile phone, a camera flash, and a small liquid crystal display (LCD) backlight. Also, the LED is applied to a large full-color outdoor electronic display board, a traffic light, a dashboard, a warning light and an approach light for a harbor, an airport, and a tall building.

A life span of the LED in a lighting device, particularly, a high-luminance LED device, reaches about 100,000 hours. Therefore, the LED is semi-permanent, and has high efficiency in power consumption and the like. Accordingly, the LED may be adopted as a lighting device for homes sooner or later.

A conventional lighting device or lighting equipment is simply switched on and off by a separate switch. When lighting is needed, the lighting device is switched on and when the lighting is not needed, the lighting device is switched off. Therefore, the user performs a limited motion to operate the lighting device.

However, the lighting equipment may need to be operated by various motions associated with the user, and a smart lighting device that differently responds to motions of the user is required. Accordingly, there is a desire for lighting equipment that is intuitive and user-centric by providing an effect as if the user produces light.

SUMMARY

An aspect of the present invention provides an illumination lighting apparatus and an illumination controlling method that is intuitive and user-centric.

Another aspect of the present invention provides an illumination lighting apparatus that is turned on and off based on a new controlling scheme that readily controls a desired area to be turned on and off by a touch motion of a user, and an illumination controlling method.

Another aspect of the present invention provides an illumination lighting apparatus and an illumination controlling method that provides intuitional light produced by controlling a color, a brightness, a illuminance, and the like, based on various motions of the user, as opposed to providing a predetermined amount of light.

Another aspect of the present invention provides an illumination lighting apparatus and illumination controlling method that receives a touch motion and a motion of a user and that provides a smart lighting device based on interaction with the user.

The foregoing and/or other aspects are achieved by providing an illumination lighting apparatus, the apparatus including a lamp unit including at least one light emitting part that is selectively turned on and off, a motion sensing unit including at least one motion sensor, transmitting a sensed signal when the at least one motion sensor senses a motion of a user, and enabling the lamp unit to provide a light corresponding to the sensed signal, and a control unit to receive the sensed signal from the motion sensing unit to adjust a light emitting type of the lamp unit in a plurality of modes, and the motion sensing unit may transmit, based on a mode of the control unit, different sensed signals to the control unit to change the light emitting type of the lamp unit.

The illumination lighting apparatus may further include a mode selecting unit to select the plurality of modes, and the mode selecting unit may include a brightness adjustment mode and a color adjustment mode.

The lamp unit may be configured as a frame including an outside wall and an inside wall, and the motion sensing unit may be included on the inside wall of the frame, may sense the motion of the user in a space formed by the inside wall, and may adjust the light emitting type of the lamp unit.

When the mode selecting unit selects the brightness adjustment mode, the motion sensing unit may recognize the motion of the user from one side to another side and adjusts a brightness of light from the lamp unit. When the mode selecting unit selects the color adjustment mode, the motion sensing unit may recognize the motion of the user from one side to another side and may adjust a color of light from the lamp unit.

The illumination lighting apparatus may further include a touch inputting unit formed on the lamp unit, and turning on and off the lamp unit by a touch motion or a drag motion of the user.

The touch inputting unit may include a plurality of touch sensors, and only an area corresponding to the touch motion or the drag motion of the user may be turned on in the lamp unit.

The touch inputting unit and the motion sensing unit may be formed on different sides.

The foregoing and/or other aspects are achieved by providing an illumination controlling method that controls an illumination of an illumination lighting apparatus including a plurality of motion sensors, the method including recognizing a motion of a user, by the motion sensors, a motion of a user, and adjusting a light emitting type of the illumination based on the recognized motion, and the light emitting type may include at least one of a brightness of light or a color of light, to adjust the brightness of light or the color of light based on the motion of the user.

An area selected by a touch motion or a drag motion of the user may be turned on. When a touch motion or a drag motion is performed on an overlapping area that is turned on, the overlapping area may be turned off.

Additional aspects of embodiments will be set forth in part in the description which follows and, in part, will be apparent from the description, or may be learned by practice of the disclosure.

EFFECT

The example embodiments may include an illumination lighting apparatus and an illumination controlling method that may provide intuitional light based on intuitive and user-centric operation.

The example embodiments may also include an illumination lighting apparatus that is turned on and off based on a new controlling scheme that readily controls a desired area to be turned on and off by a touch motion of a user, and an illumination lighting method.

The example embodiments may also include an illumination lighting apparatus and an illumination controlling method that provides intuitional light produced by controlling a color, a brightness, a illuminance, and the like, based on various motions of the user, as opposed to providing a predetermined amount of light.

The example embodiments may also include an illumination lighting apparatus and illumination controlling method that receives a touch motion and a motion of a user and that provides a smart lighting device based on interaction with the user.

BRIEF DESCRIPTION OF THE DRAWINGS

These and/or other aspects will become apparent and more readily appreciated from the following description of embodiments, taken in conjunction with the accompanying drawings of which:

FIG. 6 illustrates an example of turning off the predetermined area by re-dragging or re-touching the predetermined area of the illumination lighting apparatus of FIG. 5 that is turned on.

DETAILED DESCRIPTION

Reference will now be made in detail to embodiments, examples of which are illustrated in the accompanying drawings, wherein like reference numerals refer to the like elements throughout. Embodiments are described below to explain the present disclosure by referring to the figures.

Example embodiments may provide an illumination lighting apparatus 100 corresponding to a smart lighting device that responds to a motion of a user. Instead of merely being switched on and off, the illumination lighting apparatus 100 may turn on a predetermined area selected by the user in response to the motion of the user, and may control a color, a brightness and the like. The illumination lighting apparatus 100 has been applied to homes, companies, public places, and the like, and a range of applications is extended to various fields, such as baby products, an amusement park, and the like.

Figure 1:
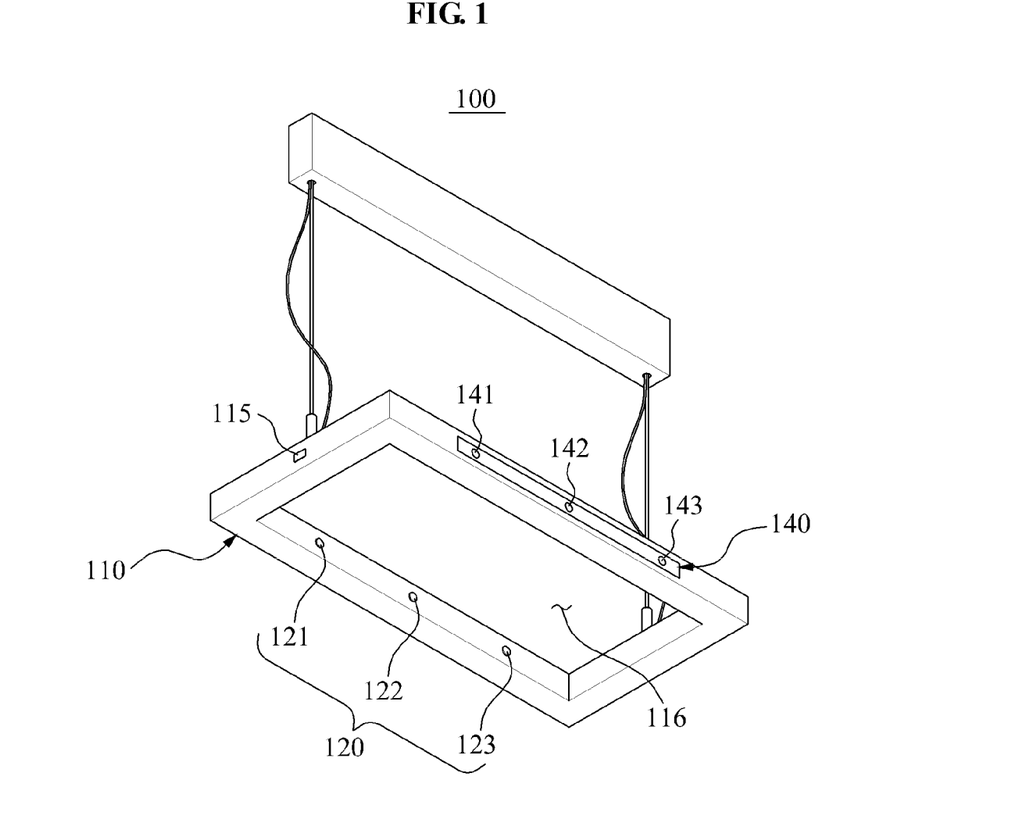
FIG. 1 is a perspective view of an illumination lighting apparatus according to an example embodiment.

The illumination lighting apparatus 100 may include a lamp unit 110, a motion sensing unit 120, and a control unit 130. FIG. 1 illustrates the illumination lighting apparatus 100 according to an example embodiment.

The lamp unit 110 may include at least one light emitting part. When a light emitting part emits light, the light may be diffused via the lamp unit 110. Although it is not illustrated, the lamp unit 110 may include various units, such as, a light guide plate and the like, to be used for diffusing and concentrating light.

The light emitting part included in the lamp unit 110 may correspond to a light emitting diode (LED) type light source. However, the light emitting part is not limited thereto, and a bulb type lamp or various alternative light sources in addition to the LED type lamp may be used as the light emitting part. A configuration of the light emitting part will be described with reference to FIG. 4.

The lamp unit 110 may be in a form of a frame including an outside wall and an inside wall, and a space is formed by the inside wall in a center of the lamp unit 110. The frame may be in a form of a doughnut. However, the frame not be limited to a circular frame, and may be various frames including a square, a triangle, and the like. In this example, the light emitting part of the lamp unit 110 may be included inside a body being in the form of the frame.

The motion sensing unit 120 may include at least one motion sensor, and may be arranged on the lamp unit 110. In an aspect of example embodiments, the motion sensing unit 120 may be arranged on the inside wall of the lamp unit 110 so that the motion sensing unit 120 senses a motion of a user in the space formed in the center of the lamp unit 110 that is in the form of the frame. The space may form a motion sensing area 116, and the motion sensing unit 120 may include a motion sensor to sense the motion of the user in the motion sensing area 116. In this example, various sensors, such as an optical sensor, an infrared light sensor, an image sensor, and the like are used as the motion sensor, and a light emitting part and a light receiving part may form a pair.

Figure 2:
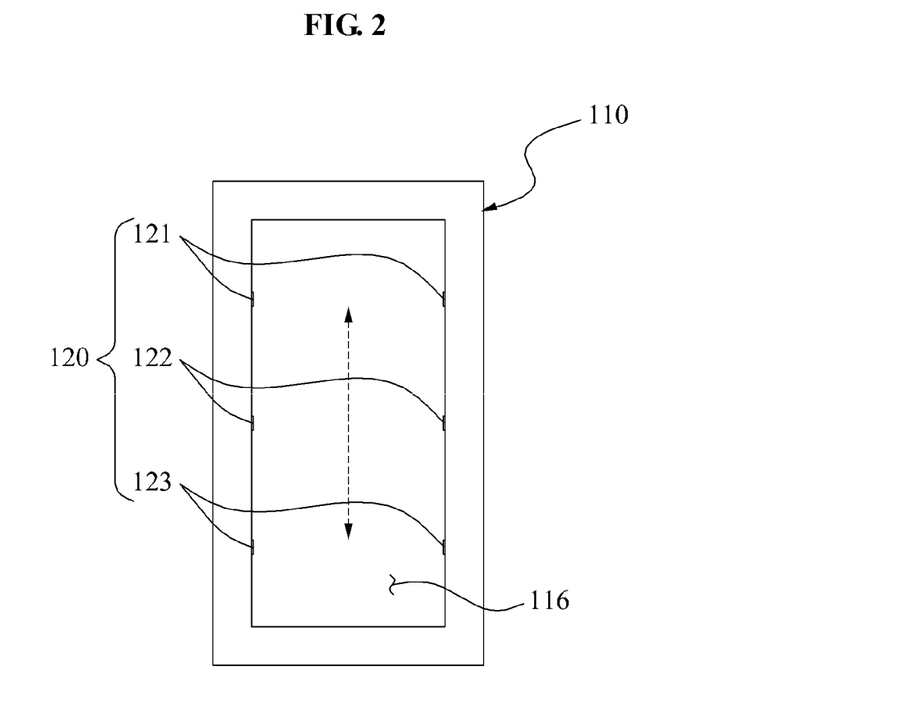
FIG. 2 illustrates arrangement of a motion sensing unit of the illumination lighting apparatus of FIG. 1 according to an example embodiment.
Figure 3:
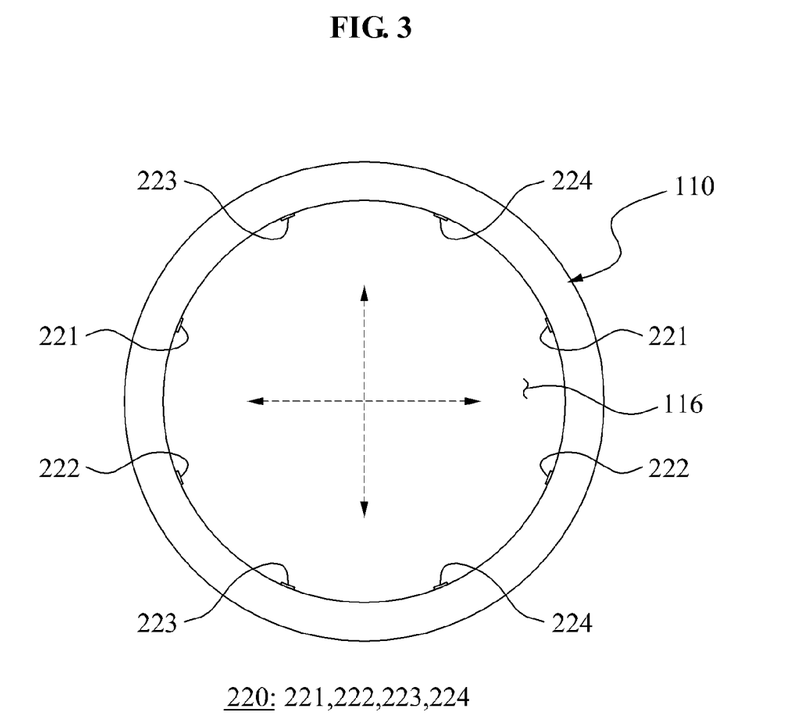
FIG. 3 illustrates arrangement of a motion sensing unit of the illumination lighting apparatus of FIG. 1 according to another example embodiment.

FIG. 2 illustrates arrangement of a motion sensing unit of the illumination lighting apparatus of FIG. 1 according to an example embodiment, and FIG. 3 illustrates arrangement of a motion sensing unit of the illumination lighting apparatus of FIG. 1 according to another example embodiment.

Referring to FIG. 2, the motion sensing unit 120 may include a motion sensor that is arranged to sense a motion of a user in one direction, in the motion sensing area 116. The motion sensor may be classified as an upper motion sensor 121, a central motion sensor 122, and a lower motion sensor 123. A hand of the user moving between a central area and an upper area may be sensed by the upper motion sensor 121 and the central motion sensor 122. Similarly, a hand of the user moving between the central area and a lower area may be sensed by the central motion sensor 122 and the lower motion sensor 123.

A motion sensing unit 220 of FIG. 3 is a motion sensing unit according to another example embodiment. The motion sensing unit 220 may include a motion sensor that is arranged to sense a planar motion of the user in the motion sensing area

116. The motion sensor may be classified as a first motion sensor 221 and a second motion sensor 222 to sense a planar motion in one direction, and a third motion sensor 223 and a fourth motion sensor 224 to sense a planar motion in another direction that is vertical to the one-direction. The motion of the user, for example, a planar motion of a hand of the user, in the motion sensing area 116 may be sensed by the first through fourth motion sensors 221, 222, 223, and 224.

When a motion sensor, for example, the motion sensor 120 and the motion sensor 220, senses the motion of the user, the motion sensor may transmit a sensed signal to the control unit 130, and the lamp unit 110 may emit various types of light through the control unit 130. For example, an intensity, a density, a brightness, a color, and the like of light may be controlled by the motion of the user.

The illumination lighting apparatus 100 may further include a mode selecting unit 140 to select a plurality of modes. The mode selecting unit 140 may be connected to the illumination lighting apparatus 100 and may enable the user to select various modes. According to an aspect of example embodiments, the mode selecting unit 140 may include a menu button 141, a brightness adjusting button 142, and a color adjusting button 143.

Two modes of the color adjustment mode or the brightness adjustment mode may be adjusted by pressing the menu button 141. In this example, when the color adjustment mode is selected and the bright adjusting button 142 is pressed, a mode for adjusting a brightness of a selected color is enabled, and when the color adjustment mode is selected and the color adjusting button 143 is pressed, a mode for adjusting a color of light is enabled. When a mode is selected, the brightness adjustment and the color adjustment of light may be controlled by the motion sensor sensing the motion of the user.

The mode selecting unit 140 may include various modes that control various types of light using the motion sensing unit, and a motion is not limited to the aforementioned described motion. The buttons described in the forgoing may be based on various schemes, such as a touch scheme, a switch scheme, and the like.

Figure 4:
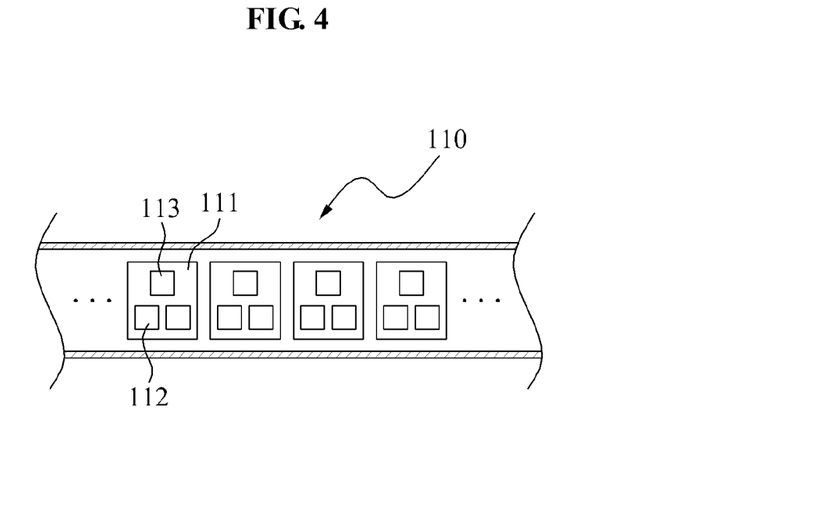
FIG. 4 illustrates a configuration for a touch sensor included in an illumination lighting apparatus according to an example embodiment.

According to an aspect of example embodiments, the illumination lighting apparatus 100 may further include a touch inputting unit that turns the illumination lighting apparatus 100 on and off. FIG. 4 illustrates a configuration for a touch sensor included in the illumination lighting apparatus 100 according to an example embodiment.

At least one light emitting part may be included in the lamp unit 110. A light emitting part 111 may include at least one light emitting unit, for example, a light emitting unit 112, and at least one touch sensor, for example, a touch sensor 113. When a plurality of light emitting parts is arranged in the lamp unit 110, a plurality of light emitting units and a plurality of touch sensors may be arranged along the lamp unit 110. In this example, the light emitting unit 112 may correspond to an LED.

When the touch sensor 113 included in the light emitting part 111 receives a touch input, the touch sensor 113 may turn on or off the light emitting unit 112 included in the same light emitting part 111. The touch sensor 113 may only affect turning on and off of the light emitting part 111 where the touch sensor 113 is included. In this manner, when the plurality of light emitting parts is arranged, light emission may be controlled from a fine area to wide area.

The light emitting part 111 included in the lamp unit 110 may include a front side light-emitting LED or a side light-emitting LED. When the front side light-emitting LED and the side light-emitting LED are combined, the lamp unit 110 may have an effect of emitting light from a front side of a frame of the lamp unit 110.

According to an aspect of example embodiments, a configuration of the light emitting unit 112 is not limited to the forgoing example, and the light emitting unit 112 may be configured as a chip, a package, and a module. For example, the light emitting unit 112 may be configured as a chip or a package formed on a substrate. In this example, the light emitting device chip or a light emitting device package may form a group by being connected to the touch sensor 113, and a plurality of groups may be arranged.

The touch inputting unit and the motion sensing unit 120 are placed in different sides of the lamp unit 110. When the motion sensing unit 120 is placed in an inside wall of the lamp unit 110, the touch inputting unit may be formed in a different side of the lamp unit 110, for example, an outside wall, as opposed to the inside wall. Accordingly, a touch input and a motion input of the user may not overlap each other.

Figure 5:
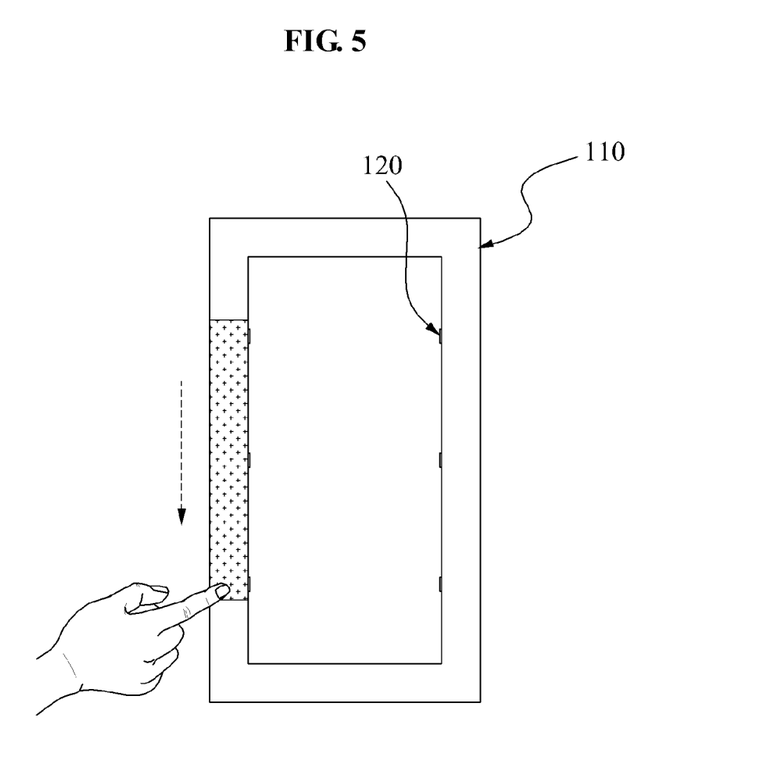
FIG. 5 illustrates an example of turning on a predetermined area by touching an illumination lighting apparatus according to an example embodiment.

A process that turns the illumination lighting apparatus 100 on and off using the touch inputting unit will be described with reference to FIGS. 5 and 6. FIG. 5 illustrates an example of turning on a predetermined area by touching the illumination lighting apparatus 100 according to an example embodiment, and FIG. 6 illustrates an example of turning off the predetermined area by re-dragging or re-touching the predetermined area of the illumination lighting apparatus 100 of FIG. 5 that is turned on.

Referring to FIG. 5, the illumination lighting apparatus 100 may turn on the lamp unit 110 by touching an exterior of the lamp unit 110, instead of powering on the lamp unit 110 with a power button 115. The light emitting unit 112 of the light emitting part 111 that includes the touch sensor 113 reacting to a touch input may emit light. In this example, when a user drags a finger on the exterior of the lamp 110 after touching the exterior, an area corresponding to touch sensors that sense the drag of the finger is powered on.

The touch input and the drag input may be provided to any portion of the exterior of the lamp unit 110, and the portion that receives the input may emit light. Accordingly, the user may control an area of the lamp unit 110 to emit light in various forms, for example, a striped pattern.

Figure 6:
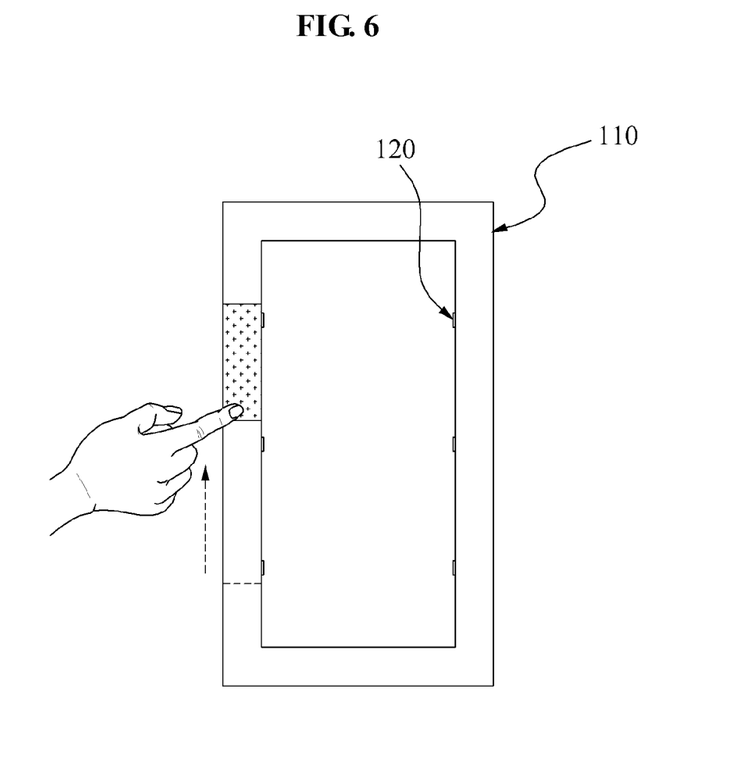

Referring to FIG. 6, the lamp unit 110 may be turned on or off by touching or dragging the exterior of the lamp unit 110. A predetermined area of the lamp unit 110 is turned on, and an area overlapping the turned-on area may be turned off by re-touching or re-dragging. Accordingly, the user may readily turn a desired area on and off by touching and dragging and thus, the user may readily change an area emitting light and a form of the area. Therefore, lighting that is more intuitional and that is more user-centric may be provided.

Figure 7:
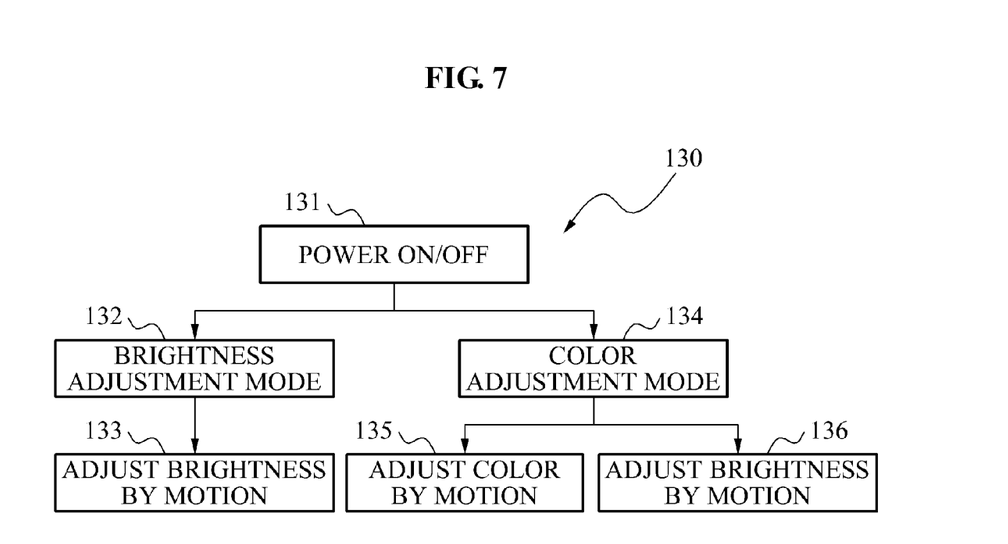
FIG. 7 is a flowchart illustrating a method of operating an illumination lighting apparatus according to an example embodiment.

A method of operating the illumination lighting apparatus 100 will be described with reference to FIG. 7. FIG. 7 illustrates a method of operating an illumination lighting apparatus according to an example embodiment. Referring to FIG. 7, the control unit 130 may receive a sensed signal through a motion sensing unit that senses a motion in a plurality of modes, and may adjust a light emitting type of the lamp unit 10.

The illumination lighting apparatus 100 may be powered on in operation 131. In this example, a separate power button 115 may be used to power on the illumination lighting apparatus 100. In addition, a touch input may enable a desired area of the lamp unit 110 to emit light.

When a whole or a portion of the lamp unit 110 emits light, the user may select a mode to adjust a light emitting type through the mode selecting unit 140.

When the user select a brightness adjustment mode in operation 132, the user may adjust a brightness of emitted light by a motion of the user, such as, by moving a hand of the user in operation 133. When the user selects the brightness adjustment mode and the user moves the hand in the motion sensing area 116, the motion sensing unit 120 may sense the motion. Light may become brighter or darker by a motion moving from one side to another side in the motion sensing area 116. Accordingly, the brightness of light may be adjusted by only moving a hand.

When the user selects a color adjustment mode in operation 134, the user may adjust both a color and a brightness of light. When the color adjusting button is pressed in the color adjustment mode in operation 143, the user may adjust the color of light in operation 135 by moving the hand of the user in the motion sensing area 116. In this example, the color of the light may vary from red to green, and to blue. Light may be emitted in various colors by combining three colors by a motion in the motion sensing area 116. In this example, when a desired color is determined, the brightness of light may be adjusted in operation 136 by pressing the brightness adjusting button 142.

Accordingly, a range of area emitting light, a brightness of light, a color of light, and the like may be controlled and adjusted by a motion of the user, including a touch, a drag, and a motion.

The motion sensing unit 220 may sense a two dimensional motion. In this example, a motion in up and down directions in the motion sensing area 116 may adjust the brightness of light, and a motion in left and right directions in the motion sensing area 116 may adjust the color of light. In this example, the user may not need to select a predetermined mode, and may simultaneously adjust the brightness and the color of light.

An illumination lighting apparatus that emits various types of light in response to a motion of the user may be configured as a pendant type, a wall-mounted type, a stand lamp type, and the like. Also, unlike the conventional lighting device, the illumination lighting apparatus may be a smart lighting device that is user-centric and intuitional.

Although embodiments have been shown and described, it would be appreciated by those skilled in the art that changes may be made in these embodiments without departing from the principles and spirit of the disclosure, the scope of which is defined by the claims and their equivalents.

What is claimed is:

1. An illumination lighting apparatus, the apparatus comprising:
    a lamp unit including at least one light emitting part that is selectively turned on and off;
    a motion sensing unit disposed on an inside wall of the lamp unit, the motion sensing unit including at least one motion sensor, transmitting a sensed signal when the at least one motion sensor senses a motion of a user, and enabling the lamp unit to provide a light corresponding to the sensed signal;
    a touch inputting unit, disposed on the lamp unit, turning the lamp unit on and off by a touch motion or a drag motion of the user; and
    a control unit to receive the sensed signal from the motion sensing unit to adjust a light emitting type of the lamp unit in a plurality of modes,
    wherein:
        the motion sensing unit transmits, based on a mode of the control unit, different sensed signals to the control unit to change the light emitting type of the lamp unit, the lamp unit is configured as a frame including an outside wall and the inside wall, and
        the motion sensing unit is on the inside wall of the frame, senses the motion of the user in a space formed by the inside wall, and adjusts the light emitting type of the lamp unit.

2. The apparatus of claim 1, further comprising:
    a mode selecting unit to select the plurality of modes,
    wherein the plurality of modes comprises a brightness adjustment mode and a color adjustment mode.

3. The apparatus of claim 2, wherein, when the mode selecting unit selects the brightness adjustment mode, the motion sensing unit recognizes the motion of the user from one side to another side and adjusts a brightness of light from the lamp unit.

4. The apparatus of claim 2, wherein, when the mode selecting unit selects the color adjustment mode, the motion sensing unit recognizes the motion of the user from one side to another side and adjusts a color of light from the lamp unit.

5. The apparatus of claim 1, wherein the touch inputting unit comprises a plurality of touch sensors, and an area corresponding to the touch motion or the drag motion of the user is only turned on in the lamp unit.

6. The apparatus of claim 1, wherein the touch inputting unit and the motion sensing unit are formed on different sides.

7. An illumination lighting apparatus comprising:
    a lamp unit including a frame having an inside wall, an outside wall, a top surface and a bottom surface that define the outside of the frame, and at least one light emitting part disposed on the bottom surface or the top surface of the frame;
    a motion sensing unit including at least one motion sensor, disposed on the inside wall of the frame, the motion sensing unit sensing the motion of the user, transmitting a sensed signal when the at least one motion sensor senses a motion of a user, and enabling the lamp unit to provide a light corresponding to the sensed signal;
    a control unit to receive the sensed signal from the motion sensing unit to adjust a light emitting type of the lamp unit in a plurality of modes;
    a touch inputting unit, disposed on the frame, turning the lamp unit on and off by a touch motion or a drag motion of the user; and
    a mode selecting unit, disposed on the outside wall of the frame, selecting a plurality of modes including a brightness adjustment mode and a color adjustment mode.

8. The illumination lighting apparatus of claim 7, wherein the frame has a circular torus shape, or a rectangular torus shape.

* * * * *